United States Patent
Velazquez Alcantar et al.

(10) Patent No.: US 11,318,946 B2
(45) Date of Patent: May 3, 2022

(54) METHODS AND SYSTEM FOR SUPER POSITIONING TORQUE VECTORING ON A DIFFERENTIAL

(71) Applicant: Ford Global Technologies, LLC, Dearborn, MI (US)

(72) Inventors: Jose Velazquez Alcantar, Canton, MI (US); Rajit Johri, Canton, MI (US); Joseph Torres, Dearborn, MI (US); Peter Barrette, Jupiter, FL (US); Michael Brewer, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 603 days.

(21) Appl. No.: 16/380,263

(22) Filed: Apr. 10, 2019

(65) Prior Publication Data
US 2020/0324770 A1    Oct. 15, 2020

(51) Int. Cl.
| | | |
|---|---|---|
| *B60W 10/16* | (2012.01) | |
| *B60W 10/06* | (2006.01) | |
| *B60W 30/02* | (2012.01) | |
| *B60W 30/188* | (2012.01) | |
| *B60W 10/08* | (2006.01) | |
| *B60W 10/188* | (2012.01) | |

(52) U.S. Cl.
CPC ......... *B60W 30/188* (2013.01); *B60W 10/06* (2013.01); *B60W 10/08* (2013.01); *B60W 10/16* (2013.01); *B60W 10/188* (2013.01); *B60W 30/02* (2013.01); *B60W 2540/10* (2013.01); *B60W 2710/027* (2013.01); *B60W 2710/0666* (2013.01); *B60W 2710/083* (2013.01); *B60W 2710/12* (2013.01); *B60W 2710/182* (2013.01); *B60W 2720/14* (2013.01); *B60W 2720/406* (2013.01)

(58) Field of Classification Search
CPC .... B60W 30/188; B60W 10/06; B60W 10/08; B60W 10/16; B60W 10/188; B60W 30/02; B60W 2540/10; B60W 2710/027; B60W 2710/0666; B60W 2710/083; B60W 2710/12; B60W 2710/182; B60W 2720/14; B60W 2720/406
See application file for complete search history.

(56) References Cited

U.S. PATENT DOCUMENTS

| | | |
|---|---|---|
| 8,296,022 B2 | 10/2012 | Severinsson et al. |
| 9,145,124 B2 | 9/2015 | Joeng |
| 2011/0144874 A1 | 6/2011 | Kirchner et al. |

*Primary Examiner* — Mathew Franklin Gordon
(74) *Attorney, Agent, or Firm* — David Kelley; McCoy Russell LLP

(57) ABSTRACT

Methods and systems are provided for controlling yaw of a vehicle while maintaining vehicle speed. In one example, equal and opposite vectoring torques are applied to first and second wheels along with a propulsion torque so that a vehicle yaw moment may be induced without accelerating or decelerating the vehicle.

20 Claims, 10 Drawing Sheets

METHODS AND SYSTEM FOR SUPER POSITIONING TORQUE VECTORING ON A DIFFERENTIAL

FIELD

The present description relates generally to methods and systems for applying torque vectoring to a vehicle for the purpose of inducing a yaw moment on the vehicle. The methods and systems may be particularly useful for vehicles that include a differential or axle having a pair of clutches.

BACKGROUND/SUMMARY

It may be desirable to generate a vehicle yaw moment from time to time to improve vehicle handling and/or stability. One way to introduce a vehicle yaw moment may be to apply a clutch of an axle or differential clutch when power is being delivered from an internal combustion engine to the axle. By applying the clutch, a torque difference between a left wheel and a right wheel may be generated, thereby inducing a vehicle yaw moment. However, inducing a vehicle yaw moment in this way has limitations. In particular, because this method distributes engine torque to generate the vehicle yaw moment, a vehicle yaw moment may not be generated when there is lack of engine torque. Consequently, when an accelerator pedal of the vehicle is released, it may be difficult to generate a desired or requested vehicle yaw moment.

The inventors herein have recognized the above-mentioned issues and have developed a vehicle operating method, comprising: requesting an increase in vectoring torque; increasing a traction torque in response to the requested increase in vectoring torque while an accelerator pedal is not applied; and increasing a torque applied via a wheel brake in response to the increase in vectoring torque.

By applying super positioning torque vectoring, it may be possible to provide a vehicle yaw moment even during conditions when driver demand torque (e.g., may also be referred to as a requested traction torque) is low or zero. In particular, equal and opposite vectoring torques may be applied to left and right wheels while also providing propulsion torque to the left and right wheels so that a vehicle yaw moment may be induced even when driver demand torque is low or zero. Super positioning torque vectoring may include adjusting a torque of a propulsion source, axle or differential clutch torque capacities, and torques applied by friction brakes. Super positioning torque vectoring also allows a vehicle yaw moment to be generated when the driver demand torque is higher and non-zero.

The present description may provide several advantages. In particular, the approach may provide vehicle yaw moment control when driver demand wheel torque is low or high. Further, the approach may be implemented on existing vehicle systems. In addition, the approach may be applied to electric vehicles, hybrid vehicles, and vehicles having internal combustion engines.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
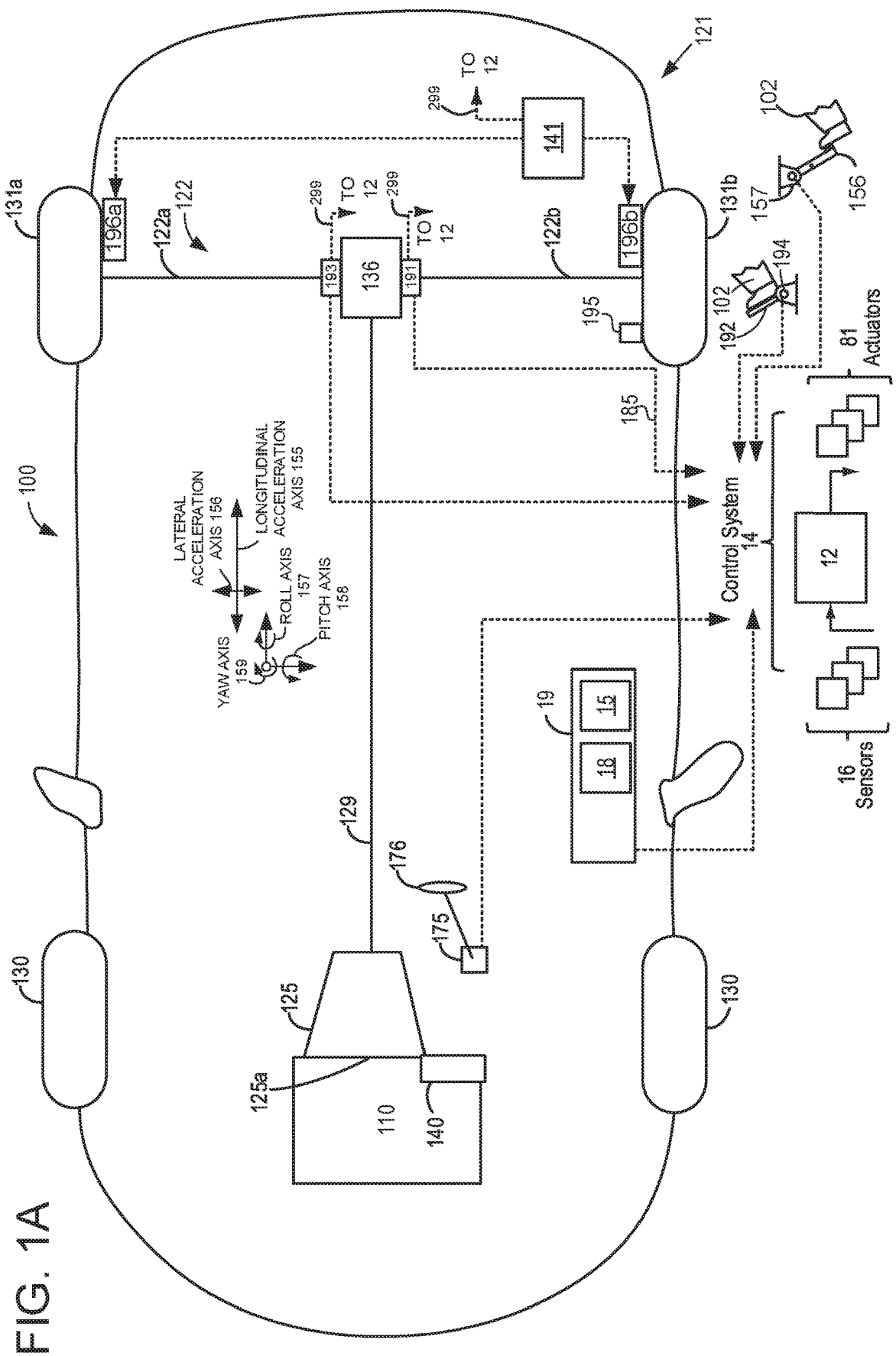
FIG. 1A is a schematic diagram of a first example vehicle driveline.
Figure 1B:
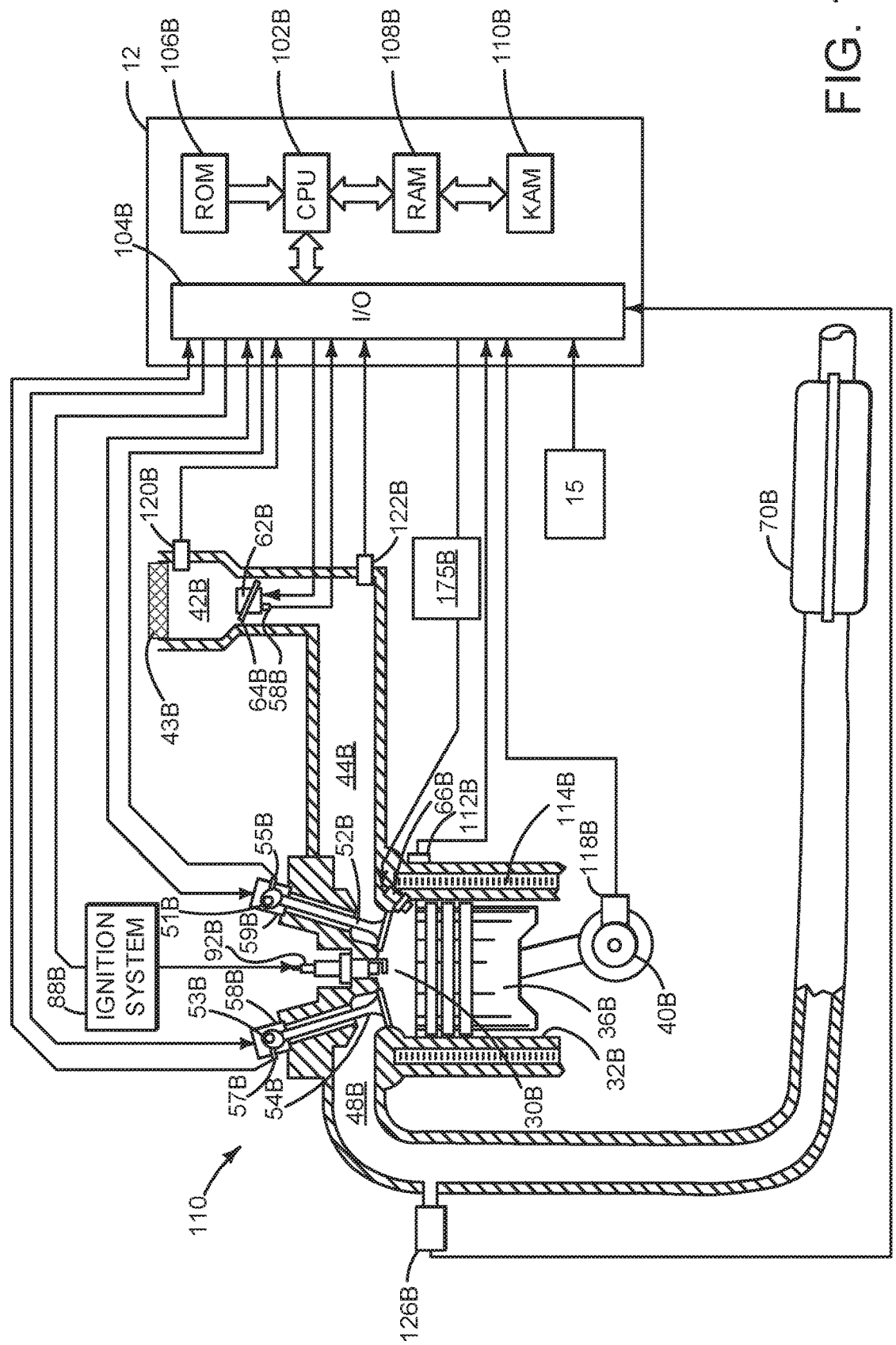
FIG. 1B is a schematic diagram of an example engine that is included in the vehicle driveline of FIG. 1A.
Figure 2:
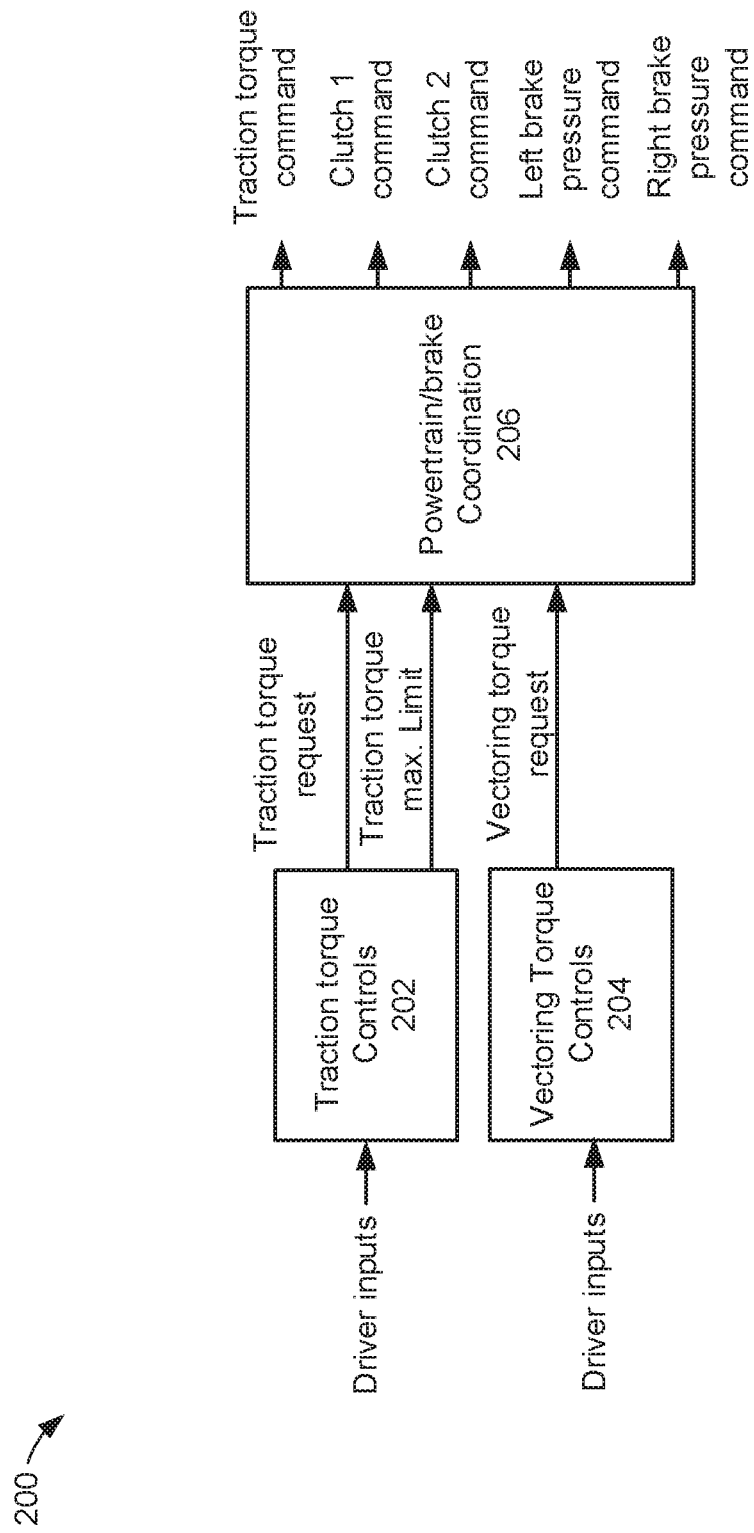
FIG. 2 is a block diagram of example control system partitioning.
Figure 3:
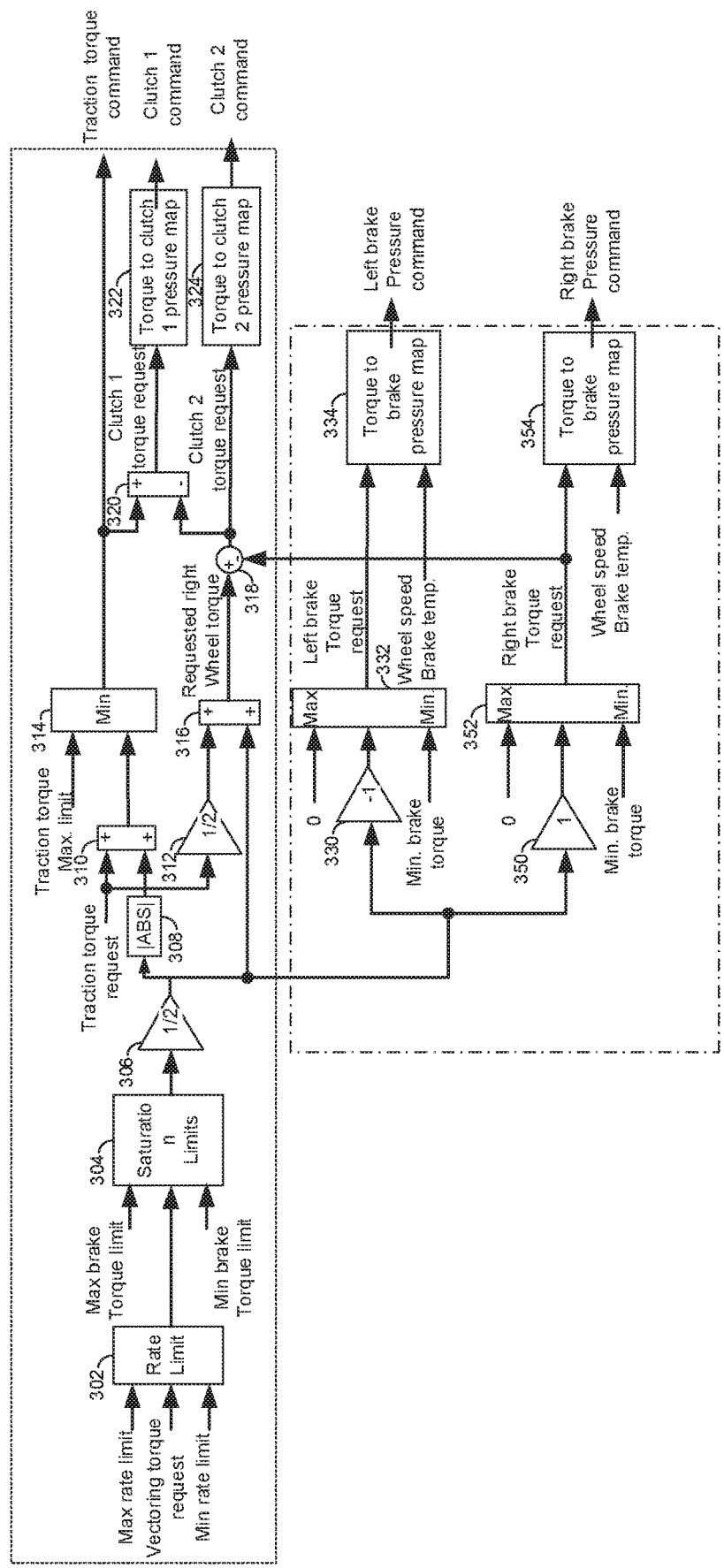
FIG. 3 is a block diagram of an example torque vectoring controller.
Figure 4:
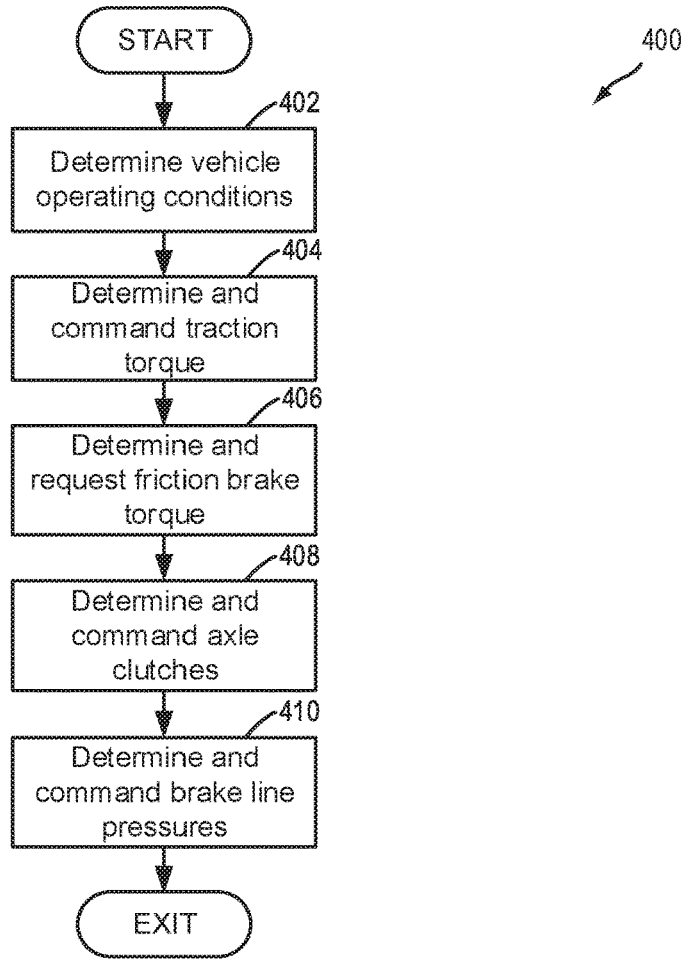
FIG. 4 is a flowchart of a method for controlling torque delivery of a vehicle axle.

The following description relates to systems and methods for operating a vehicle. FIGS. 1A and 1B show example vehicle systems that include a driveline including an axle with a differential. A high level control system partitioning scheme is shown in FIG. 2. A block diagram of a torque vectoring controller is shown in FIG. 3. A flowchart of a method for super positioning torque vectoring is shown in FIG. 4. FIGS. 5-8 show prophetic examples of super positioning torque vectoring as applied to a vehicle that includes an axle with clutches, vehicle wheel brakes, and one or more vehicle propulsion sources.

FIG. 1A illustrates an example vehicle propulsion system 100 for vehicle 121. Vehicle propulsion system 100 includes an internal combustion engine 110. Engine 110 may consume liquid fuel (e.g. gasoline) to produce an engine output. Throughout the description of FIG. 1A, mechanical connections between various components is illustrated as solid lines, whereas electrical connections between various components are illustrated as dashed lines.

Vehicle propulsion system 100 has a front axle (not shown) and a rear axle 122. In some examples, rear axle may comprise two half shafts, for example first half shaft 122a, and second half shaft 122b. Vehicle propulsion system 100 further has front wheels 130 and rear wheels 131a and 131b. The rear axle 122 is coupled to transmission 125 via driveshaft 129. The rear axle 122 may be driven via engine 110. Differential gear set (e.g., differential) 136 may transfer power from engine 110, to axle 122, resulting in rotation of drive wheels 131a and 131b. Differential 136 may include a gear set, right electrically controlled differential clutch 193 that adjusts torque transfer to axle 122a, and left electrically controlled differential clutch 191 that adjusts torque transfer to axle 122b. Alternatively, clutches 191 and 193 may be included between differential 136 and wheels 131a and 131b. In some examples, electrically controlled differential clutches 191 and 193 may communicate a clutch torque capacity (e.g., an amount of torque the clutch may transfer and the clutch torque capacity may increase in response to an increasing force applied to close the clutch) of the electrically controlled differential clutch via controller area network (CAN) bus 299. Torque transfer to half shafts 122*a* and 122*b* may be prevented when electrically controlled differential clutches 191 and 193 are open. Torque transfer to half shaft 122*a* may be different from torque transferred to half shaft 122*b* when clutch 191 is partially closed (e.g., slipping such that speed input to clutch 191 is different than speed output of the clutch) and when clutch 193 is open, or vice-versa.

A transmission 125 is illustrated in FIGS. 1A and 1*t* is connected between engine 110 at a front side of the transmission 125*a*. In one example, transmission 125 is a dual clutch transmission (DCT). Alternatively, transmission 125 may be a step-ratio transmission.

Control system 14 may communicate with one or more of engine 110, clutches 193 and 191, transmission 125, brake controller 141, etc. Control system 14 may receive sensory feedback information from one or more of engine 110, transmission 125, clutches 193 and 191, brake controller 141, etc. Further, control system 14 may send control signals to one or more of engine 110, clutches 191 and 193, brake controller 141, transmission 125, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a starter 140. Starter 140 may comprise an electric motor, hydraulic motor, etc., and may be used to rotate engine 110 so as to initiate engine 110 operation under its own power.

Vehicle propulsion system 100 may further include a brake system control module (BSCM) 141. In some examples, BSCM 141 may comprise an anti-lock braking system, such that wheels (e.g. 130, 131*a*, 131*b*) may maintain tractive contact with the road surface according to driver inputs while braking, which may thus prevent the wheels from locking up, to prevent skidding. In some examples, BSCM may receive input from wheel speed sensors 195. Further brake system control module 141 may communicate with controller 12 via CAN 299. BSCM may apply right friction brakes 196*a* and left friction brakes 196*b* to apply torque to rotors (not shown) that are coupled to half shafts 122*a* and 122*b* to slow wheels 131*a* and 131*b*.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include, wheel speed sensor(s) 195, vehicle yaw rate sensors, vehicle longitudinal acceleration sensors, vehicle lateral acceleration sensors, steering wheel position sensors, an accelerator pedal position sensor, a brake pedal position sensor, clutch fluid pressure sensors for clutches 191 and 193, etc. In some examples, sensors associated with engine 110, transmission 125, clutches 191 and 193, etc., may communicate information to controller 12, regarding various states of engine, and transmission as will be discussed in further detail with regard to FIG. 1B.

Dashboard 19 may include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., engine 110) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle.

Several of the vehicle's axes relative to its environment are indicated via arrows 155-159. In particular, the longitudinal acceleration axis of vehicle 121 is indicated by arrow 155. The lateral acceleration axis of vehicle 121 is indicated by arrow 156. The roll axis of vehicle 121 is indicated by arrow 157. The pitch axis of vehicle 121 is indicated by arrow 158. The yaw axis of vehicle 121 is indicated by arrow 159. It should be noted that the various axes have been placed in a location that is convenient for display and general direction indication; however, the actual axes may vary from the position shown as they may actually fall about the vehicle's center of gravity (not shown), for example.

Referring to FIG. 1B, a detailed view of internal combustion engine 110, comprising a plurality of cylinders, one cylinder of which is shown in FIG. 1B, is shown. Engine 110 is controlled by electronic engine controller 111B. Engine 110 includes combustion chamber 30B and cylinder walls 32B with piston 36B positioned therein and connected to crankshaft 40B. Combustion chamber 30B is shown communicating with intake manifold 44B and exhaust manifold 48B via respective intake valve 52B and exhaust valve 54B. Each intake and exhaust valve may be operated by an intake cam 51B and an exhaust cam 53B. The position of intake cam 51B may be determined by intake cam sensor 55B. The position of exhaust cam 53B may be determined by exhaust cam sensor 57B. Intake cam 51B and exhaust cam 53B may be moved relative to crankshaft 40B. Intake valves may be deactivated and held in a closed state via intake valve deactivating mechanism 59B. Exhaust valves may be deactivated and held in a closed state via exhaust valve deactivating mechanism 58B.

Fuel injector 66B is shown positioned to inject fuel directly into cylinder 30B, which is known to those skilled in the art as direct injection. Alternatively, fuel may be injected to an intake port, which is known to those skilled in the art as port injection. Fuel injector 66B delivers liquid fuel in proportion to the pulse width of signal from engine controller 111B. Fuel is delivered to fuel injector 66B by a fuel system 175B, which includes a tank and pump. In addition, intake manifold 44B is shown communicating with optional electronic throttle 62B (e.g., a butterfly valve) which adjusts a position of throttle plate 64B to control air flow from air filter 43B and air intake 42B to intake manifold 44B. Throttle 62B regulates air flow from air filter 43B in engine air intake 42B to intake manifold 44B. In some examples, throttle 62B and throttle plate 64B may be positioned between intake valve 52B and intake manifold 44B such that throttle 62B is a port throttle.

Distributorless ignition system 88B provides an ignition spark to combustion chamber 30B via spark plug 92B in response to engine controller 111B. Universal Exhaust Gas Oxygen (UEGO) sensor 126B is shown coupled to exhaust manifold 48B upstream of catalytic converter 70B in a direction of exhaust flow. Alternatively, a two-state exhaust gas oxygen sensor may be substituted for UEGO sensor 126B.

Converter 70B can include multiple catalyst bricks, in one example. In another example, multiple emission control devices, each with multiple bricks, can be used. Converter 70B can be a three-way type catalyst in one example.

Controller 12 is shown in FIG. 1B as a conventional microcomputer including: microprocessor unit 102B, input/output ports 104B, read-only memory 106B (e.g., non-transitory memory), random access memory 108B, keep alive memory 110B, and a conventional data bus. Other controllers mentioned herein may have a similar processor and memory configuration. Controller 12 is shown receiving various signals from sensors coupled to engine 110, in addition to those signals previously discussed, including: engine coolant temperature (ECT) from temperature sensor 112B coupled to cooling sleeve 114B; a measurement of engine manifold pressure (MAP) from pressure sensor 122B coupled to intake manifold 44B; an engine position sensor from a Hall effect sensor 118B sensing crankshaft 40B position; a measurement of air mass entering the engine from sensor 120B; and a measurement of throttle position from sensor 58B. Barometric pressure may also be sensed (sensor not shown) for processing by engine controller 111B. In a preferred aspect of the present description, engine position sensor 118B produces a predetermined number of equally spaced pulses every revolution of the crankshaft from which engine speed (RPM) can be determined. Controller 12 may receive input from human/machine interface 15 (e.g., pushbutton or touch screen display as described in FIG. 1A).

During operation, each cylinder within engine 110 typically undergoes a four stroke cycle: the cycle includes the intake stroke, compression stroke, expansion stroke, and exhaust stroke. During the intake stroke, generally, the exhaust valve 54B closes and intake valve 52B opens. Air is introduced into combustion chamber 30B via intake manifold 44B, and piston 36B moves to the bottom of the cylinder so as to increase the volume within combustion chamber 30B. The position at which piston 36B is near the bottom of the cylinder and at the end of its stroke (e.g. when combustion chamber 30B is at its largest volume) is typically referred to by those of skill in the art as bottom dead center (BDC). During the compression stroke, intake valve 52B and exhaust valve 54B are closed. Piston 36B moves toward the cylinder head so as to compress the air within combustion chamber 30B. The point at which piston 36B is at the end of its stroke and closest to the cylinder head (e.g. when combustion chamber 30B is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92B, resulting in combustion. During the expansion stroke, the expanding gases push piston 36B back to BDC. Crankshaft 40B converts piston movement into a rotational torque of the rotary shaft. Finally, during the exhaust stroke, the exhaust valve 54B opens to release the combusted air-fuel mixture to exhaust manifold 48B and the piston returns to TDC. Note that the above is shown merely as an example, and that intake and exhaust valve opening and/or closing timings may vary, such as to provide positive or negative valve overlap, late intake valve closing, or various other examples.

Figure 1C:
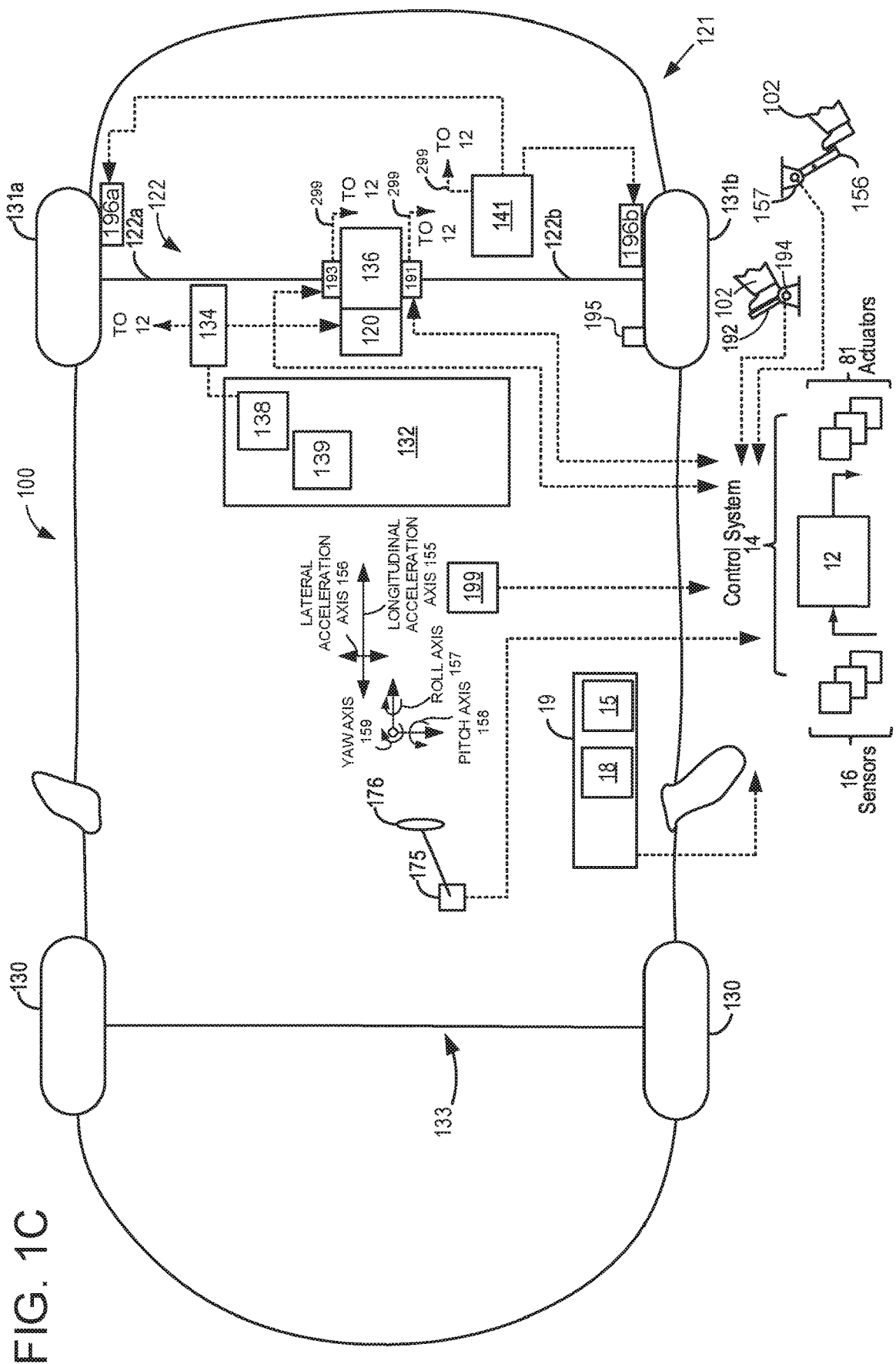
FIG. 1C is a schematic diagram of a second example vehicle driveline.

FIG. 1C illustrates an example alternative vehicle propulsion system 100 for vehicle 121. Many of the devices and systems shown in FIG. 1A are also shown in FIG. 1C. These devices and systems are indicated by like numerical identifiers and they operate as previously described. Therefore, for the sake of brevity, their description has been omitted.

Vehicle propulsion system 100 has a front axle 133 and a rear axle 122. In some examples, rear axle may comprise two half shafts, for example first half shaft 122a, and second half shaft 122b. Vehicle propulsion system 100 further includes front wheels 130 and rear wheels 131a and 131b. In this example, front wheels 130 and/or rear wheels 131a and 131b may be driven via electrical propulsion sources. The rear axle 122 is coupled to electric machine 120. Electric machine 120 is shown coupled to differential 136, and differential 136 is part of axle 122.

Electric machine 120 may receive electrical power from onboard electrical energy storage device 132. Furthermore, electric machine 120 may provide a generator function to convert the vehicle's kinetic energy into electrical energy, where the electrical energy may be stored at electric energy storage device 132 for later use by the electric machine 120. An inverter system controller (ISC1) 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 120, energy storage device 132, clutches 191 and 193, and braking controller 141. Control system 14 may receive sensory feedback information from one or more of electric machine 120, energy storage device 132, etc. Further, control system 14 may send control signals to one or more of electric machine 120, clutches 191 and 193, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Electric energy storage device 132 includes an electric energy storage device controller 139. Electric energy storage device controller 139 may provide charge balancing between energy storage element (e.g., battery cells) and communication with other vehicle controllers (e.g., controller 12).

Vehicle system 100 may also include inertial sensors 199. Inertial sensors 199 may comprise one or more of the following: longitudinal, latitudinal, vertical, yaw, roll, and pitch sensors (e.g., accelerometers). Axes of yaw, pitch, roll, lateral acceleration, and longitudinal acceleration are as indicated. The control system may adjust electric machine output and/or the torque vectoring electric machines to increase vehicle stability in response to sensor(s) 199.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

The systems of FIGS. 1A-1C show controller 12 and braking controller 141, but the methods and systems described herein are not limited to one configuration. Rather, the system may include a single controller or it may distribute control via additional controllers. For example, the system may include a separate controllers configured in hardware and in the form of a vehicle controller, an engine controller, an electric machine controller, a braking system controller, and a vehicle stability controller. Alternatively, the system may include a single controller configured in hardware for performing the method described herein. Thus, the system described herein should not be construed as limiting.

Thus, the system of FIGS. 1A-1C provides for a vehicle system, comprising: an accelerator pedal; a propulsion source; an axle system coupled to the propulsion source including a first wheel brake, a second wheel brake, a first clutch, and a second clutch; and a controller including executable instructions stored in non-transitory memory to adjust torque output of the propulsion source in response to a position of the accelerator pedal and a vectoring torque, and further executable instructions stored in non-transitory memory to increase a torque capacity of the second clutch and apply a braking torque via the first wheel brake in response to the vectoring torque. The vehicle system includes where the vectoring torque is a torque that generates yaw of a vehicle. The vehicle system includes where the propulsion source is an electric machine. The vehicle system includes where the propulsion source is an internal combustion engine. The vehicle system further comprises additional executable instructions stored in non-transitory memory to increase torque output of the propulsion source in an amount equal to one half of the vectoring torque.

FIG. 2 shows a high level block diagram 200 of control system partitioning. Traction torque controls are performed in block 202, which receives inputs from the vehicle's driver (e.g., a human or autonomous driver). The driver inputs may include, but are not limited to accelerator pedal position and brake pedal position. The traction torque controls output a traction torque request (e.g., a request for an amount of torque at the vehicle's wheels) and a traction torque maximum limit (e.g., a threshold traction torque amount that is not to be exceeded).

Vectoring torque controls are performed in block 204, which receives inputs from the vehicle's driver (e.g., a human or autonomous driver). The vectoring torque controls may receive input from vehicle yaw rate, longitudinal acceleration, lateral acceleration, pitch, and roll sensors. Further, the vectoring torque controls may receive input via driver inputs that may include, but are not limited to accelerator pedal position and brake pedal position. The vectoring torque controls output a vectoring torque request (e.g., a request for an amount of vectoring torque to apply to the vehicle's wheels).

Powertrain and friction braking coordination are performed in block 206. The powertrain and friction braking controls receive the traction torque request, the traction torque limit, and the vectoring torque request and output a traction torque command (e.g., a torque to propel or slow the vehicle via a torque source), a left clutch command (e.g., a command for clutch 191 shown in FIG. 1A), a right clutch command, (e.g., a command for clutch 193 shown in FIG. 1A), a left brake pressure command (e.g., a pressure of hydraulic pressure applied to the left brake of the driven axle), and a right brake pressure command (e.g., a pressure of hydraulic pressure applied to the right brake of the driven axle).

Referring now to FIG. 3, a control block diagram 300 for providing super position vectoring torque is shown. The block diagram 300 may be included as executable instructions stored in non-transitory memory of a controller (e.g., controller 12). The control block diagram 300 may deliver torque to vehicle wheels according to the following equations:

$$\tau_{right} = \frac{1}{2} \cdot \tau_{traction} + \frac{1}{2} \cdot \tau_{vectoring} \qquad (1)$$

$$\tau_{left} = \frac{1}{2} \cdot \tau_{traction} + \frac{1}{2} \cdot \tau_{vectoring} \qquad (2)$$

$$\tau_{total} = \tau_{right} + \tau_{left} = \tau_{traction} \qquad (3)$$

$$\Delta\tau = \tau_{right} - \tau_{left} = \tau_{vectoring} \qquad (1)$$

where $\tau_{right}$ is torque at the right wheel, $\tau_{traction}$ is the requested traction torque (e.g., may also be referred to as a driver demand wheel torque), $\tau_{vectoring}$ is the requested vectoring torque (e.g., a torque for generating a vehicle yaw moment via a driven axle and wheels), and $\tau_{left}$ is the torque at the left wheel. These equations describe super positioning the vectoring torque on top of the traction torque.

A vectoring torque request is input to block 302. The vectoring torque request may be based on vehicle speed, vehicle yaw rate, vehicle longitudinal acceleration, vehicle lateral acceleration and other inertia inputs. For example, if a yaw rate sensor outputs a signal indicating a vehicle yaw rate of five degrees per second, the controller may output a requested vectoring torque request of 500 Newton-meters to partially counter act the five degree per second yaw rate. The vectoring torque request may be calculated or determined via tables and functions stored in controller memory that include empirically determined values for vectoring torque. The vectoring torque request is rated limited between a minimum rate (e.g., −500 Newton-meters/second) and a maximum rate (e.g., 500 Newton-meters/second) at block 302. Thus, if the vectoring torque request is 800 Newton-meters/second and the maximum vectoring torque rate limit is 500 Newton-meters/second, then block 302 outputs a value of 500 Newton-meters/second. The rate limited vectoring torque it output to block 304.

At block 304, maximum and minimum brake torque limits are applied to the vectoring torque request. The vectoring torque request is limited between a minimum brake torque (e.g., −2000 Newton-meters) and a maximum rate (e.g., 2000 Newton-meters) at block 304. Thus, if the vectoring torque request is 2800 Newton-meters and the maximum vectoring torque rate limit is 2000 Newton-meters, then block 304 outputs a value of 2000 Newton-meters. The brake torque limited vectoring torque is output to block 306.

Block 306 multiplies the brake torque limited vectoring torque by a value of 0.5 and it outputs the result to blocks 308, 316, 330, and 350. The absolute value of the output of block 306 is taken at block 308 and block 308 provides its output to block 310. At block 310, a sum of a traction torque request and the vectoring torque output of block 308 is determined and it is passed to block 314. At block 314, the sum of the traction torque request and the vectoring torque is limited to less than a maximum traction torque.

Thus, the traction torque command is determined as the sum of the traction torque request and the absolute value of half the vectoring torque request. The traction torque request is the traction torque requested by the powertrain in response to the driver input and vehicle measurements (e.g., vehicle speed). Since the vehicle's friction brakes can only remove torque from the wheels, the method described herein increases the traction torque such that whatever torque is removed by the brake on one wheel, the same quantity of torque is added to the other wheel by a torque source (e.g., engine 110 or electric machine 120). To achieve this, the absolute value of one half of the vectoring torque request is added to the traction torque request. Thus, the method described herein increases the total amount of torque applied to an axle and removes the same amount of torque from one wheel via the friction brake system so that the propulsion torque (e.g., the torque to propel the vehicle forward) is equal to the traction torque command. Thus, the vectoring torque request is delivered in equal and opposite quantities at the vehicle wheels resulting in no net change in the total torque output from the axle to the wheels while creating the desired torque difference on the axle.

Block 312 also receives the traction torque request and the traction torque request is multiplied by 0.5 at block 312. The output of block 312 and the output of block 306 are received by block 316. Block 316 sums half of the traction torque request and half of the vectoring torque request to generate a right wheel torque request that is input to summing junction 318. The right wheel torque requested is added to the right friction brake torque request to generate a right clutch torque request. The right clutch torque request is input to block 320 and block 324. Block 324 converts the right clutch torque request into a pressure to activate the right clutch and the right clutch is commanded via the pressure. The right clutch torque request is subtracted from the traction torque that is output from block 314 to generate a left clutch torque request. The left clutch torque request is input to block 322. Block 322 converts the left clutch torque request into a pressure to activate the left clutch and the left clutch is commanded via the pressure.

Thus, the requested right wheel torque may be calculated as indicated in equation one. In order to obtain the right clutch torque request, the right brake torque request is subtracted from the requested right wheel torque. This ensures that the right clutch torque request adds the appropriate amount of torque to cancel out the friction torque that is applied to the right wheel. The left clutch torque request is determined by subtracting the right clutch torque request from the total traction torque command. This ensures that the delivered wheel torque does not exceed the commanded traction torque command. The individual clutch pressure commands are generated via a look up table or via feedback control.

One half of the vector torque request output from block 306 is input to block 330 where it is multiplied by a value of −1 and the output of block 330 is input to block 332. At block 332, maximum and minimum brake torque limits are applied to the vectoring torque request. Half of the vectoring torque request is limited between a minimum brake torque (e.g., −2000 Newton-meters) and a maximum limit (e.g., 0 Newton-meters) at block 332. The brake torque limited half vectoring torque is output to block 334 as a left brake torque request. The left brake torque request is converted into a pressure for applying the left friction brake at block 334. The left wheel brake pressure is determined as a function of left wheel speed and brake temperature.

One half of the vector torque request output from block 306 is also input to block 350 where it is multiplied by a value of 1 and the output of block 350 is input to block 352. At block 352, maximum and minimum brake torque limits are applied to the vectoring torque request. Half of the vectoring torque request is limited between a minimum brake torque (e.g., −2000 Newton-meters) and a maximum rate (e.g., 0 Newton-meters) at block 352. The brake torque limited half vectoring torque is output to block 354 as a right brake torque request. The right brake torque request is converted into a pressure for applying the right friction brake at block 354. The right wheel brake pressure is determined as a function of right wheel speed and brake temperature.

Thus, the left friction brake torque request is determined by multiplying half the vectoring torque request by negative one and applying a maximum threshold limit of zero Newton-meters and a predetermined minimum threshold limit. Similarly, the right friction brake torque request is determined as half the vectoring torque request and applying a maximum threshold limit of zero Newton-meters and a predetermined threshold minimum limit. If the vectoring torque request is positive, the maximum/minimum threshold limits ensure that vectoring torque is achieved by the left friction brake while the right friction brake torque request is zero. Similarly, if the vectoring torque request is negative, the maximum/minimum threshold limits ensure that vectoring torque is achieved by the right friction brake while the left friction brake torque request is zero. This procedure automatically handles the handoff between the left and right friction brakes. The resulting friction brake torque requests are mapped to individual brake pressure commands via a map which can be a function of torque request, wheel speed, brake temperature, and brake pressure among other measurements.

Referring now to FIG. 4, a method for controlling torque delivery of a vehicle axle is shown. The method of FIG. 4 may be incorporated into and may cooperate with the system of FIGS. 1A-1C. Further, at least portions of the method of FIG. 4 may be incorporated as executable instructions stored in non-transitory memory while other portions of the method may be performed via a controller transforming operating states of devices and actuators in the physical world.

At 402, method 400 determines vehicle operating conditions. Vehicle operating conditions may include but are not limited to accelerator pedal position, brake pedal position, vehicle speed, engine torque, electric machine torque, a vector torque request, a traction torque request, and various limits that may be stored in controller memory. In one example, accelerator pedal position and vehicle speed are used to reference or index a table to determine the traction torque request or the driver demand wheel torque. The values in the table may be empirically determined values of traction torque. The values may be determined via operating the vehicle on a dynamometer and adjusting values in the table until desired vehicle performance metrics are achieved. The traction torque request is a wheel torque request generated to accelerate or decelerate the vehicle in the longitudinal direction. The vectoring torque request may be determined from inertial inputs as previously described or via other known methods. The vectoring torque request is a torque request to generate a vehicle yaw moment about the vehicle's driven axle (e.g., axle that receives torque from a torque source). Method 400 proceeds to 404.

At 404, method 400 determines and commands a traction torque. In one example, the traction torque may be determined via evaluating the following:

Traction_tq_cmd=min(traction_tq_req+(0.5*abs(vectoring_tq_req)), Traction_tq_max_limit) where Traction_tq_cmd is the traction torque command, min is a function that returns a lesser of argument 1 (traction_tq_req+(0.5*abs(vectoring_tq_req)) and argument 2 (Traction_tq_max_limit), traction_tq_req is the traction torque request as determined from accelerator pedal position, abs is a function that returns an absolute value of an argument (vectoring_tq_req), vectoring_tq_req is a vectoring torque request, and Traction_tq_max_limit is a not to be exceeded threshold for the traction torque command. Method 400 proceeds to 406.

At 406, method 400 determines friction braking torque requests. In one example, the left and right friction brake torques may be determined via evaluating the following:

Left_brake_tq_req=max(min(−0.5*vectoring_tq_req, min_brak_tq),0)

Right_brake_tq_req=max(min(0.5*vectoring_tq_req, min_brak_tq),0)

where Left_brake_tq_req is the left friction brake torque request, Right_brake_tq_req is the right friction brake torque request, min_brake_tq is a minimum friction brake torque threshold, max is a function that returns a maximum or argument 1 and argument 2, and the other parameters are as previously described. Method 400 proceeds to 408.

At 408, method 400 determines and commands the axle clutches. In one example, the axle clutch torques may be determined via evaluating the following:

Right_whl_tq_req=0.5*traction_tq_req+0.5*vectoring_tq_req

Left_clutch_tq_cmd=Right_whl_tq_req−Right_brake_tq_req

Right_clutch_tq_cmd=Traction_tq_cmd−Left_clutch_tq_cmd where Right_whl_tq_req is the right wheel torque request, Left_clutch_tq_cmd is the left clutch torque command, and Right_cluthc_tq_cmd is the right clutch torque command, and the other parameters are as previously described. Method 400 proceeds to 410.

At 410, method 400 determines and commands the friction brakes. In one example, the friction brake pressures may be determined via evaluating the following:

Left_brake_pressure_cmd=f(Left_brake_tq_req,left_wheel_speed,left_brake_temp)

Right_brake_pressure_cmd=f(Right_brake_tq_req, Right_wheel_speed,Right_brake_temp)

where Left_brake_pressure_cmd is a left brake pressure command, f is a function that returns a value of a brake pressure given arguments 1-N, Right_brake_pressure_cmd is a right brake pressure command, Left_brake_tq_req is the left friction brake torque request, left_wheel_speed is the left_wheel_speed, and left_brake_temp is the left wheel brake temperature, Right_brake_tq_req is a right brake torque request, Right_wheel_speed is a right wheel speed, and Right_brak_temp is a right brake temperature. Method 400 proceeds to exit.

In this way, traction torque and vectoring torque may be supplied to wheels so that propulsion torque is not increased or decreased when vectoring torque is generated via the axle and wheels. The vectoring torque may be generated whether or not a driver is requesting torque via an accelerator pedal.

Thus, the method of FIG. 4 provides for a vehicle operating method, comprising: requesting an increase in vectoring torque; increasing a traction torque in response to the requested increase in vectoring torque while an accelerator pedal is not applied; and increasing a torque applied via a wheel brake in response to the increase in vectoring torque. The method further comprises increasing a torque capacity of a second clutch in response to the increase in vectoring torque. The method further comprises operating a first clutch with zero torque capacity in response to the increase in vectoring torque. The method includes where the vectoring torque is a torque that generates yaw via an axle of a vehicle. The method includes where the traction torque is increased via increasing output of an electric machine or an internal combustion engine. The method includes where the wheel brake is a left wheel brake. The method further comprises maintaining a constant total axle torque based on accelerator pedal position.

The method of FIG. 4 also provides for a vehicle operating method, comprising: commanding a driveline wheel torque that is a sum of a requested traction torque and a first portion of a requested vectoring torque; commanding a first brake to generate a first brake torque, the first brake torque based on the first portion of the requested vectoring torque; commanding a second brake to generate a second brake torque, the second brake torque based on the first portion of the requested vectoring torque; commanding a first clutch to a first clutch torque capacity, the first clutch torque capacity based on a requested torque of a first wheel and the first portion of the requested vectoring torque; and commanding a second clutch to a second clutch torque capacity, the second clutch torque capacity based on the first clutch torque capacity and the requested traction torque. The method includes where the first brake is a left brake, and where the second brake is a right brake. The method includes where first clutch is a left clutch, and where the second clutch is a right clutch.

In some examples, the method includes where the first wheel is a right wheel, and further comprising: commanding a pressure of fluid supplied to first brake that is a function of a requested left wheel brake torque, a left_wheel_speed, a left wheel temperature; and commanding a pressure of fluid supplied to second brake that is a function of a requested right wheel brake torque, a right wheel speed, and a right wheel temperature. The method includes where commanding a driveline wheel torque includes commanding an engine to generate the driveline wheel torque. The method includes where commanding a driveline wheel torque includes commanding an electric machine to generate the driveline wheel torque. The method includes where first portion of the requested vectoring torque is one half of the requested vectoring torque. The method includes where the vectoring torque is a torque for generating a yaw moment for a vehicle.

In another representation, the method of FIG. 4 provides for a vehicle operating method, comprising: delivering a requested traction torque to vehicle wheels when an accelerator pedal is not applied; and generating a torque differential between driven wheels via increasing torque of an electric machine, applying a right friction brake of an axle, and increasing a torque capacity of a left side axle clutch. The method includes increasing output of the electric machine by one half of a requested vectoring torque. The method also includes where the vectoring torque is a torque to generate a vehicle yaw moment via right and left driven wheels.

Figure 5:
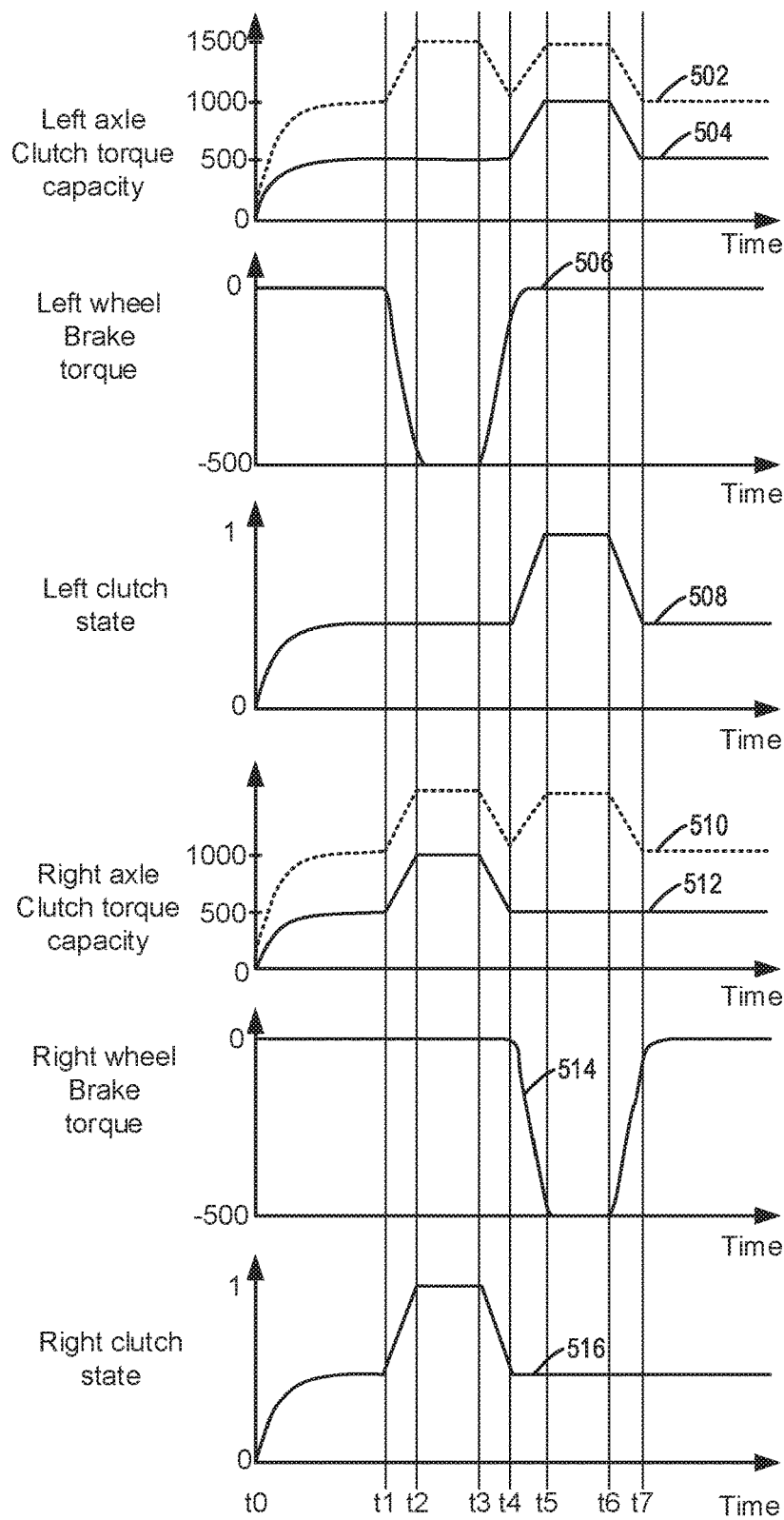
FIG. 5 shows an example torque vectoring sequence when a driver demand torque is present.

Referring now to FIG. 5, an example vehicle operating sequence according to the method of FIG. 4 and the controller of FIG. 3 is shown. The systems of FIGS. 1A-1C may provide the operating sequence. The vertical lines at times t0-t7 represent times of interest during the sequence. The plots are aligned in time and occur at a same time.

The first plot from the top of FIG. 5 is a plot of left side clutch torque capacity (e.g., an amount of torque that the clutch may transfer from one side of the clutch to the other side of the clutch) versus time. The vertical axis represents left side clutch torque capacity (e.g., capacity of clutch 191 shown in FIG. 1A) and the torque capacity increases in the direction of the vertical axis arrow. The horizontal axis represents time and time increases from the left side of the plot to the right side of the plot. Line 502 represents a traction torque command from a human driver. Line 504 represents torque capacity of a left clutch. The torque values along the vertical axis are in Newton-meters.

The second plot from the top of FIG. 5 is a plot of left side friction brake torque (e.g., an amount of torque that the friction brake may generate) versus time. The vertical axis represents left side friction brake torque (e.g., torque supplied by friction brake 196b shown in FIG. 1A) and the torque increases in the direction of the vertical axis arrow. The horizontal axis represents time and time increases from the left side of the plot to the right side of the plot. Line 506 represents a left side friction brake torque. The torque values along the vertical axis are in Newton-meters.

The third plot from the top of FIG. 5 is a plot of left side clutch state versus time. The horizontal axis represents left side clutch operating state and the left side clutch is completely disengaged and transferring zero torque when the state of the clutch is zero. The left side clutch is completely engaged and transferring torque at its full capacity when the state of the clutch is one. The left side clutch is partially engaged and it may transfer torque when the state of the clutch is between zero and one. The horizontal axis represents time and time increases from the left side of the plot to the right side of the plot. Line 508 represents an operating state of the left clutch.

The fourth plot from the top of FIG. 5 is a plot of right side clutch torque capacity (e.g., an amount of torque that the clutch may transfer from one side of the clutch to the other side of the clutch) versus time. The vertical axis represents right side clutch torque capacity (e.g., capacity of clutch 193 shown in FIG. 1A) and the torque capacity increases in the direction of the vertical axis arrow. The horizontal axis represents time and time increases from the left side of the plot to the right side of the plot. Line 510 represents a traction torque command from a human driver. Line 512 represents torque capacity of a left clutch. The torque values along the vertical axis are in Newton-meters.

The fifth plot from the top of FIG. 5 is a plot of right side friction brake torque (e.g., an amount of torque that the friction brake may generate) versus time. The vertical axis represents right side friction brake torque (e.g., torque supplied by friction brake 196a shown in FIG. 1A) and the torque increases in the direction of the vertical axis arrow. The horizontal axis represents time and time increases from the left side of the plot to the right side of the plot. Line 514 represents a right side friction brake torque. The torque values along the vertical axis are in Newton-meters.

The sixth plot from the top of FIG. 5 is a plot of right side clutch state versus time. The horizontal axis represents right side clutch operating state and the right side clutch is completely disengaged and transferring zero torque when the state of the clutch is zero. The right side clutch is completely engaged and transferring torque at its full capacity when the state of the clutch is one. The right side clutch is partially engaged and it may transfer torque when the state of the clutch is between zero and one. The horizontal axis represents time and time increases from the left side of the plot to the right side of the plot. Line 516 represents an operating state of the right clutch.

FIG. 5 illustrates a maneuver where the human driver requests the powertrain to make a wheel torque and torque vectoring is requested while the driver requested wheel torque is being provided.

Between time 0 and time t1, the human driver (not shown) requests 1000 Newton-meters and so the traction torque command is increased to 1000 Newton-meters. The left and right clutches are partially closed and slipping at a same rate since vectoring torque is not requested. Further, the left and right friction brakes are not applied.

A vectoring torque of 1000 Newton-meters is requested at time t1. Therefore, the traction torque command is increased by 500 Newton-meters to 1500 Newton-meters. One half of the requested 1000 Newton-meters of vectoring torque is applied to increase the traction torque command. Engine and/or electric machine torque may be commanded to provide the increased amount of traction torque. In addition, the left friction brake is applied at time t1 in response to the 1000 Newton-meters of vectoring torque, thereby removing −500 Newton-meters of torque at the left wheel. Further, the right clutch capacity is commanded to increase to lock the right clutch and the left clutch capacity remains at its previous capacity. These actions send an additional 500 Newton-meters of torque to the right wheel and 500 Newton-meters of torque is removed from the left wheel via the left friction brake being applied. Thus, the net wheel torque remains 1000 Newton-meters and the torque difference between the right and left wheel generates a delta or vectoring torque of 1000 Newton-meters. The traction torque reaches the value of 1500 Newton-meters, the right clutch capacity is increased to 1000 Newton-meters, and the left wheel friction brake reaches −500 Newton-meters at time t2.

At time t3, the request for vectoring torque of 1000 Newton-meters is withdrawn. Therefore, the traction torque command is decreased by 500 Newton-meters to 1000 Newton-meters. No vectoring torque is applied to increase the traction torque command. Engine and/or electric machine torque may be reduced to provide the decreased amount of traction torque. Also, the left friction brake begins to be released at time t3 in response to the 1000 Newton-meters of vectoring torque being withdrawn, thereby starting a reduction of friction braking torque at the wheel. The right clutch capacity begins to be decreased to unlock the right clutch and the left clutch capacity remains at its previous capacity. These actions begin to remove 500 Newton-meters of torque to the right wheel and 500 Newton-meters of torque begins to be added to the left wheel via the left friction brake being released. Thus, the net wheel torque remains 1000 Newton-meters and the torque difference between the right and left wheel begins to decline. The traction torque reaches the value of 1000 Newton-meters, the right clutch capacity is decreased to 500 Newton-meters, and the left wheel friction brake reaches zero Newton-meters just before time t4.

At time t4, the vectoring torque is adjusted to −1000 Newton-meters. Therefore, the traction torque command is increased by 500 Newton-meters to 1500 Newton-meters. One half of the absolute value of the requested 1000 Newton-meters of vectoring torque is applied to increase the traction torque command. The right friction brake is applied at time t4 in response to the 1000 Newton-meters of vectoring torque, thereby removing −500 Newton-meters of torque from the right wheel. The left clutch capacity is commanded to increase to lock the left clutch and the right clutch capacity remains at its previous capacity. These actions send an additional 500 Newton-meters of torque to the left wheel and 500 Newton-meters of torque is removed from the right wheel via the right friction brake being applied. Thus, the net wheel torque remains 1000 Newton-meters and the torque difference between the right and left wheel generates a delta or vectoring torque of −1000 Newton-meters. The traction torque reaches the value of 1500 Newton-meters, the left clutch capacity is increased to 1000 Newton-meters, and the right wheel friction brake reaches −500 Newton-meters at time t5.

At time t6, the request for vectoring torque of 1000 Newton-meters is withdrawn. Therefore, the traction torque command is decreased by 500 Newton-meters to 1000 Newton-meters. No vectoring torque is applied to increase the traction torque command. Engine and/or electric machine torque may be reduced to provide the decreased amount of traction torque. Also, the right friction brake begins to be released at time t6 in response to the 1000 Newton-meters of vectoring torque being withdrawn, thereby starting a reduction of friction braking torque at the wheel. The left clutch capacity begins to be decreased to unlock the left clutch and the right clutch capacity remains at its previous capacity. These actions begin to remove 500 Newton-meters of torque to the left wheel and 500 Newton-meters of torque begins to be added to the right wheel via the right friction brake being released. Thus, the net wheel torque remains 1000 Newton-meters and the torque difference between the right and left wheel begins to decline. The traction torque reaches the value of 1000 Newton-meters, the left clutch capacity is decreased to 500 Newton-meters, and the right wheel friction brake reaches zero Newton-meters just before time t7.

Figure 6:
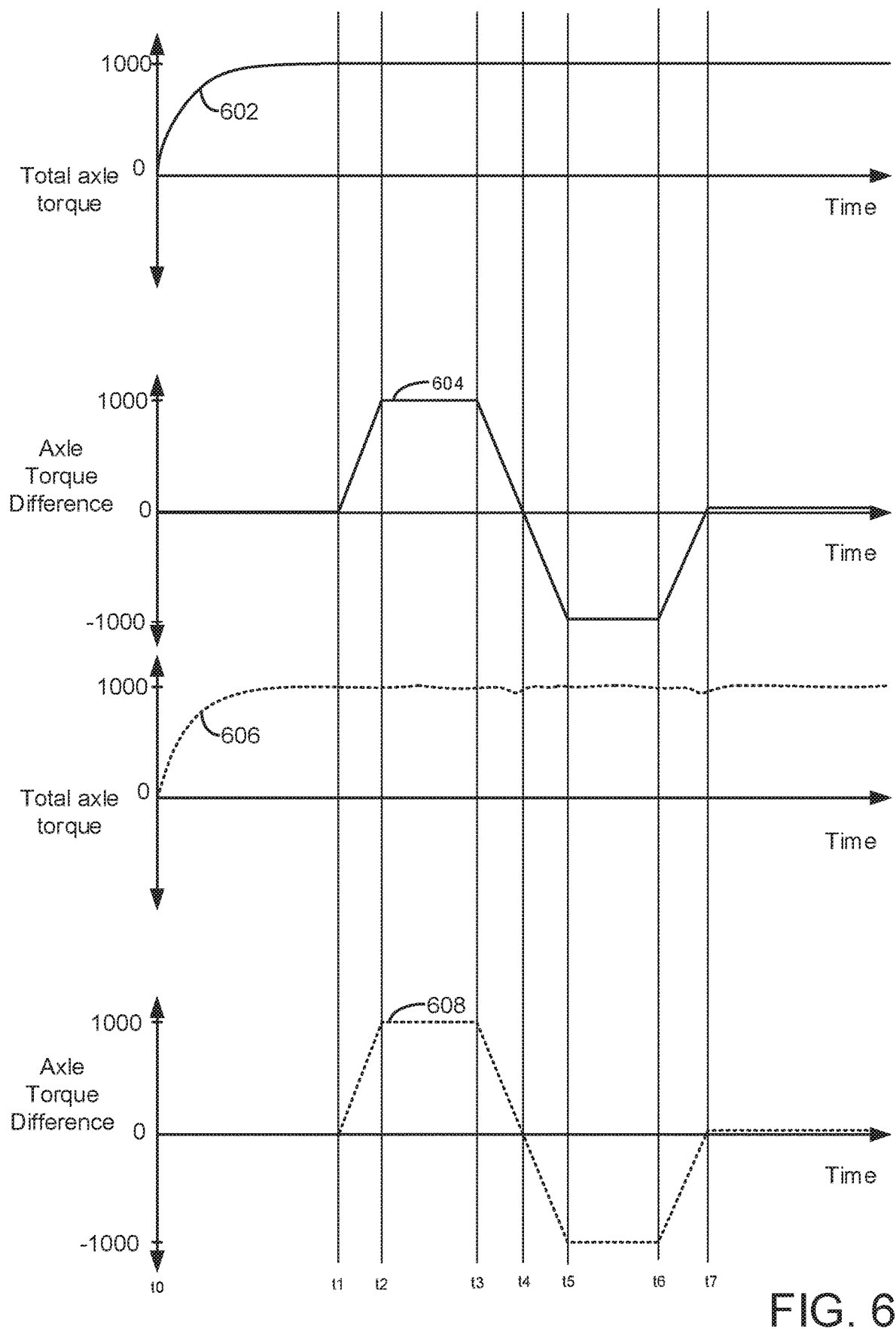
FIG. 6 shows plots of a total amount of torque that is delivered via an axle when a driver demand torque is present.

Referring now to FIG. 6, plots showing total axle torque delivered to vehicle wheels and the axle torque difference between the wheels or between the half shafts according to the sequence of FIG. 5 are shown. The times t0-t7 shown in FIG. 6 correspond to the same times t0-t7 that are shown in FIG. 5.

The first plot from the top of FIG. 6 is a plot of traction torque requested versus time. The vertical axis represents the traction torque request amount and the traction torque request amount increases in the direction of the vertical axis arrow. The horizontal axis represents time and time increases from the left side of the plot to the right side of the plot.

The second plot from the top of FIG. 6 is a plot of vectoring torque requested versus time. The vertical axis represents the vectoring torque request amount and the vectoring torque request amount increases in the direction of the vertical axis arrow. The horizontal axis represents time and time increases from the left side of the plot to the right side of the plot.

The third plot from the top of FIG. 6 is a plot of torque delivered via the axle to wheels versus time. The vertical axis represents the torque delivered via the axle to wheels and the torque delivered via the axle to wheels increases in the direction of the vertical axis arrow. The horizontal axis represents time and time increases from the left side of the plot to the right side of the plot.

The fourth plot from the top of FIG. 6 is a plot of vectoring torque that is a delivered via the axle to the wheels and/or half shafts versus time. The vertical axis represents the vectoring torque that is delivered via the axle to the wheels and the vectoring torque that is delivered via the axle to the wheels increases in the direction of the vertical axis arrow. The horizontal axis represents time and time increases from the left side of the plot to the right side of the plot.

At time t0, the traction torque request begins to be increased to 1000 Newton-meters and the torque that is delivered via the axles to the wheels begins to increase to 1000 Newton-meters. Vectoring torque is not requested so the vectoring torque request is zero. The vectoring torque is not delivered to the axle.

At time t1, the vectoring torque request begins to be increased to 1000 Newton-meters and the vectoring torque that is delivered by the axle begins to increase. The vectoring torque reaches 1000 Newton-meters and the vectoring torque that is delivered by the axle reaches 1000 Newton-meters at time t2. The total torque that is delivered via the axis changes very little and is substantially constant (e.g., changes by less than 5%) as the vectoring torque is changed from time t1 to time t2.

At time t3, the vectoring torque request begins to be decreased and the vectoring torque that is delivered by the axle begins to decrease. The vectoring torque reaches 0 Newton-meters and the vectoring torque that is delivered by the axle reaches 0 Newton-meters at time t4. The vectoring torque request continues to decrease and it reaches −1000 Newton-meters at time t5. The vectoring torque that is delivered by the axle reaches −1000 Newton-meters at time t5. The total torque that is delivered via the axis changes very little and is substantially constant (e.g., changes by less than 5%) as the vectoring torque is changed from time t3 to time t5. At time t6, the vectoring torque request begins to be increased to 0 Newton-meters and the vectoring torque that is delivered by the axle begins to decrease. The total torque that is delivered via the axis changes very little and is substantially constant (e.g., changes by less than 5%) as the vectoring torque is changed. The total torque that is delivered via the axis changes very little and is substantially constant (e.g., changes by less than 5%) as the vectoring torque is changed from time t6 to time t7.

Figure 7:
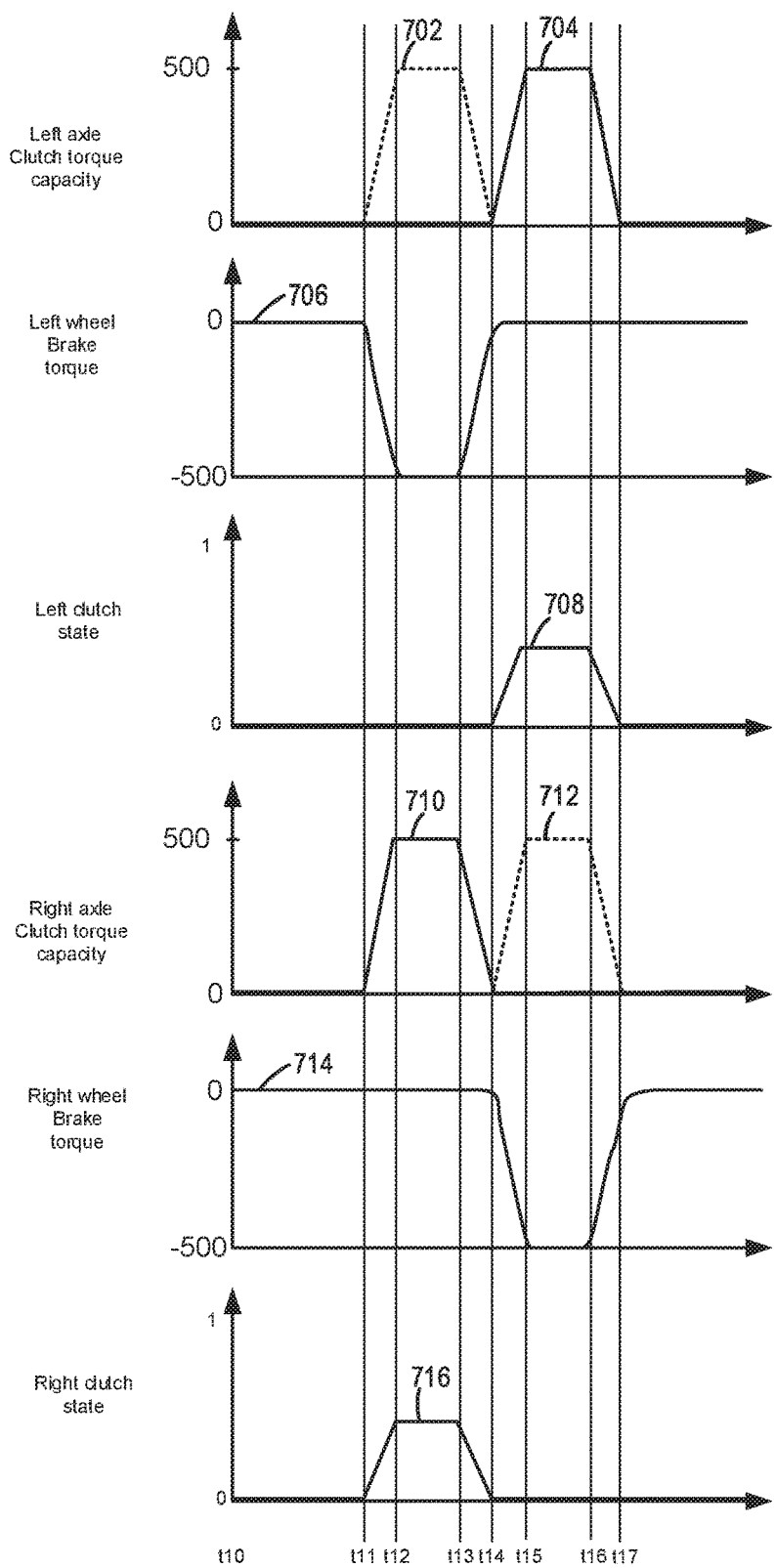
FIG. 7 shows an example torque vectoring sequence when a driver demand torque is not present.

Referring now to FIG. 7, an example vehicle operating sequence according to the method of FIG. 4 and the controller of FIG. 3 is shown. The systems of FIGS. 1A-1C may provide the operating sequence. The vertical lines at times t10-t17 represent times of interest during the sequence. The plots are aligned in time and occur at a same time.

The first plot from the top of FIG. 7 is a plot of left side clutch torque capacity (e.g., an amount of torque that the clutch may transfer from one side of the clutch to the other side of the clutch) versus time. The vertical axis represents left side clutch torque capacity (e.g., capacity of clutch 191 shown in FIG. 1A) and the torque capacity increases in the direction of the vertical axis arrow. The horizontal axis represents time and time increases from the left side of the plot to the right side of the plot. Line 702 represents a traction torque command from a human driver. Line 704 represents torque capacity of a left clutch. The torque values along the vertical axis are in Newton-meters.

The second plot from the top of FIG. 7 is a plot of left side friction brake torque (e.g., an amount of torque that the friction brake may generate) versus time. The vertical axis represents left side friction brake torque (e.g., torque supplied by friction brake 196b shown in FIG. 1A) and the torque increases in the direction of the vertical axis arrow. The horizontal axis represents time and time increases from the left side of the plot to the right side of the plot. Line 706 represents a left friction wheel brake torque. The torque values along the vertical axis are in Newton-meters.

The third plot from the top of FIG. 7 is a plot of left side clutch state versus time. The horizontal axis represents left side clutch operating state and the left side clutch is completely disengaged and transferring zero torque when the state of the clutch is zero. The left side clutch is completely engaged and transferring torque at its full capacity when the state of the clutch is one. The left side clutch is partially engaged and it may transfer torque when the state of the clutch is between zero and one. The horizontal axis represents time and time increases from the left side of the plot to the right side of the plot. Line 708 represents an operating state of the left clutch.

The fourth plot from the top of FIG. 7 is a plot of right side clutch torque capacity (e.g., an amount of torque that the clutch may transfer from one side of the clutch to the other side of the clutch) versus time. The vertical axis represents right side clutch torque capacity (e.g., capacity of clutch 193 shown in FIG. 1A) and the torque capacity increases in the direction of the vertical axis arrow. The horizontal axis represents time and time increases from the left side of the plot to the right side of the plot. Line 712 represents a traction torque command from a human driver. Line 710 represents torque capacity of a right clutch. The torque values along the vertical axis are in Newton-meters.

The fifth plot from the top of FIG. 7 is a plot of right side friction brake torque (e.g., an amount of torque that the friction brake may generate) versus time. The vertical axis represents right side friction brake torque (e.g., torque supplied by friction brake 196a shown in FIG. 1A) and the torque increases in the direction of the vertical axis arrow. The horizontal axis represents time and time increases from the left side of the plot to the right side of the plot. Line 714 represents a right friction wheel brake torque. The torque values along the vertical axis are in Newton-meters.

The sixth plot from the top of FIG. 7 is a plot of right side clutch state versus time. The horizontal axis represents right side clutch operating state and the right side clutch is completely disengaged and transferring zero torque when the state of the clutch is zero. The right side clutch is completely engaged and transferring torque at its full capacity when the state of the clutch is one. The right side clutch is partially engaged and it may transfer torque when the state of the clutch is between zero and one. The horizontal axis represents time and time increases from the left side of the plot to the right side of the plot. Line 716 represents an operating state of the right clutch.

FIG. 7 illustrates a maneuver where the human driver requests no wheel torque and torque vectoring is requested while the driver requested wheel torque is zero.

Between time t10 and time t11, the human driver (not shown) requests 0 Newton-meters and so the traction torque command is 0 Newton-meters. The left and right clutches fully open since there is no vectoring torque request. Further, the left and right friction brakes are not applied.

A vectoring torque of 1000 Newton-meters is requested at time t11. Therefore, the traction torque command is increased by 500 Newton-meters to 500 Newton-meters. One half of the requested 1000 Newton-meters of vectoring torque is applied to increase the traction torque command. Engine and/or electric machine torque may be commanded to provide the increased amount of traction torque. In addition, the left friction brake is applied at time t11 in response to the 1000 Newton-meters of vectoring torque, thereby removing −500 Newton-meters of torque at the left wheel. Further, the right clutch capacity is commanded to increase to lock the right clutch and the left clutch capacity remains open. These actions send an additional 500 Newton-meters of torque to the right wheel and 500 Newton-meters of torque is removed from the left wheel via the left friction brake being applied. Thus, the net wheel torque remains 0 Newton-meters and the torque difference between the right and left wheel generates a delta or vectoring torque of 1000 Newton-meters. The traction torque reaches the value of 500 Newton-meters, the right clutch capacity is increased to 1000 Newton-meters, and the left wheel friction brake reaches −500 Newton-meters at time t12.

At time t13, the request for vectoring torque of 1000 Newton-meters is withdrawn. Therefore, the traction torque command is decreased by 500 Newton-meters to 0 Newton-meters. No vectoring torque is applied to increase the traction torque command. Engine and/or electric machine torque may be reduced to provide the decreased amount of traction torque. Also, the left friction brake begins to be released at time t13 in response to the 1000 Newton-meters of vectoring torque being withdrawn, thereby starting a reduction of friction braking torque at the wheel. The right clutch capacity begins to be decreased to unlock the right clutch and the left clutch capacity remains at its previous capacity. These actions begin to remove 500 Newton-meters of torque to the right wheel and 500 Newton-meters of torque begins to be added to the left wheel via the left friction brake being released. Thus, the net wheel torque remains 0 Newton-meters and the torque difference between the right and left wheel begins to decline. The traction torque reaches the value of 0 Newton-meters, the right clutch capacity is decreased to 0 Newton-meters, and the left wheel friction brake reaches zero Newton-meters just before time t14.

At time t14, the vectoring torque is adjusted to −1000 Newton-meters. Therefore, the traction torque command is increased by 500 Newton-meters to 500 Newton-meters. One half of the absolute value of the requested 1000 Newton-meters of vectoring torque is applied to increase the traction torque command. The right friction brake is applied at time t14 in response to the 1000 Newton-meters of vectoring torque, thereby removing −500 Newton-meters of torque from the right wheel. The left clutch capacity is commanded to increase to transfer torque to the left wheel and the right clutch capacity is zero. These actions send 500 Newton-meters of torque to the left wheel and 500 Newton-meters of torque is removed from the right wheel via the right friction brake being applied. Thus, the net wheel torque remains 0 Newton-meters and the torque difference between the right and left wheel generates a delta or vectoring torque of −1000 Newton-meters. The traction torque reaches the value of 500 Newton-meters, the left clutch capacity is increased to 500 Newton-meters, and the right wheel friction brake reaches −500 Newton-meters at time t15.

At time t16, the request for vectoring torque of −1000 Newton-meters is withdrawn. Therefore, the traction torque command is decreased by 500 Newton-meters to 0 Newton-meters. No vectoring torque is applied to increase the traction torque command. Engine and/or electric machine torque may be reduced to provide the decreased amount of traction torque. Also, the right friction brake begins to be released at time t16 in response to the 1000 Newton-meters of vectoring torque being withdrawn, thereby starting a reduction of friction braking torque at the right wheel. The left clutch capacity begins to be decreased to unlock the left clutch and the right clutch capacity remains at its previous capacity. These actions begin to remove 500 Newton-meters of torque to the left wheel and 500 Newton-meters of torque begins to be added to the right wheel via the right friction brake being released. Thus, the net wheel torque remains 0 Newton-meters and the torque difference between the right and left wheel begins to decline. The traction torque reaches the value of 0 Newton-meters, the left clutch capacity is decreased to 0 Newton-meters, and the right wheel friction brake reaches zero Newton-meters just before time t17.

Figure 8:
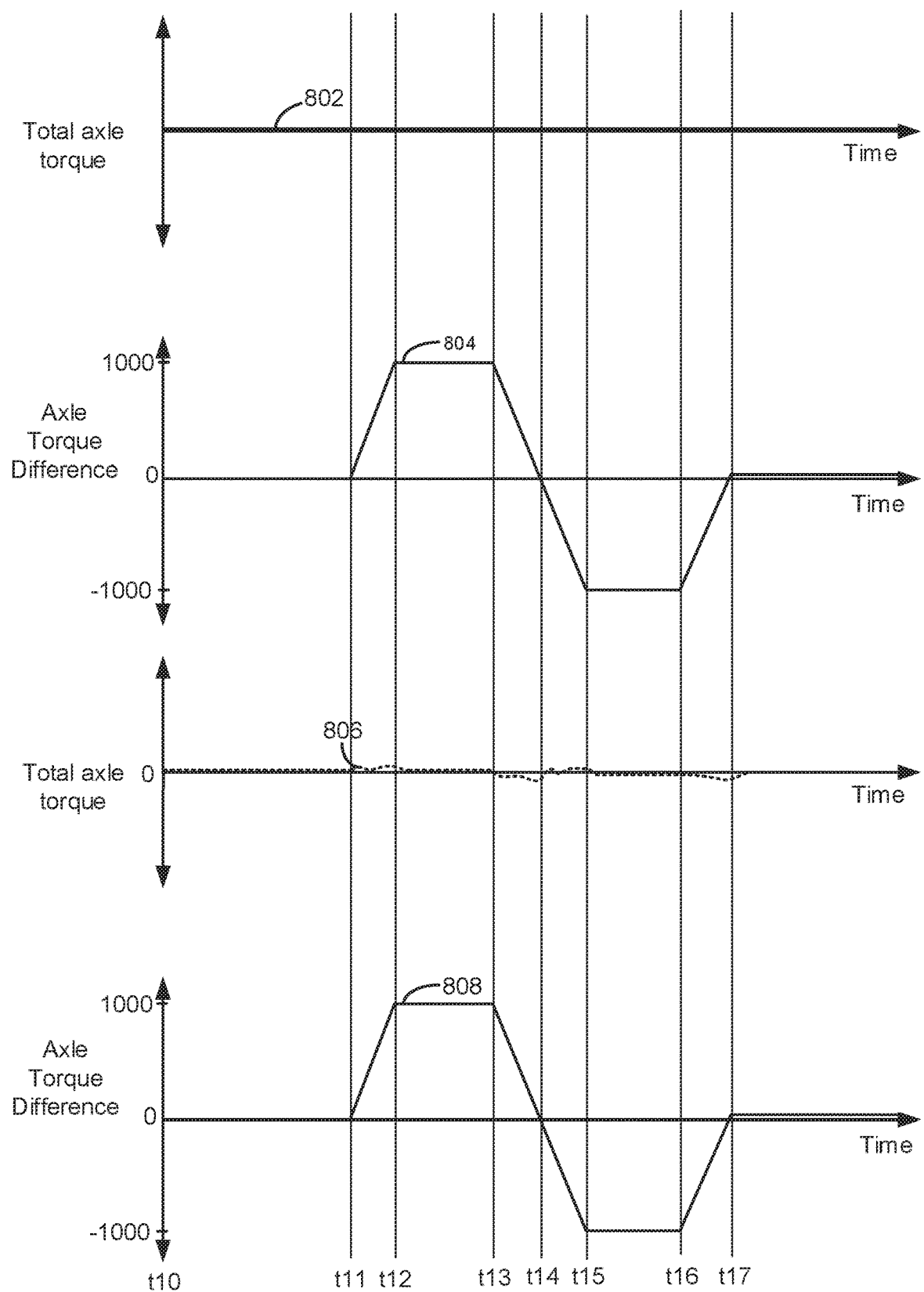
FIG. 8 shows plots of a total amount of torque that is delivered via an axle when a driver demand torque is not present.

Referring now to FIG. 8, plots showing total axle torque delivered to vehicle wheels and the axle torque difference between the wheels or between the half shafts according to the sequence of FIG. 7 are shown. The times t10-t17 shown in FIG. 8 correspond to the same times t10-t17 that are shown in FIG. 7.

The first plot from the top of FIG. 8 is a plot of traction torque requested versus time. The vertical axis represents the traction torque request amount and the traction torque request amount increases in the direction of the vertical axis arrow. The horizontal axis represents time and time increases from the left side of the plot to the right side of the plot.

The second plot from the top of FIG. 8 is a plot of vectoring torque requested versus time. The vertical axis represents the vectoring torque request amount and the vectoring torque request amount increases in the direction of the vertical axis arrow. The horizontal axis represents time and time increases from the left side of the plot to the right side of the plot.

The third plot from the top of FIG. 8 is a plot of torque delivered via the axle to wheels versus time. The vertical axis represents the torque delivered via the axle to wheels and the torque delivered via the axle to wheels increases in the direction of the vertical axis arrow. The horizontal axis represents time and time increases from the left side of the plot to the right side of the plot.

The fourth plot from the top of FIG. 8 is a plot of vectoring torque that is a delivered via the axle to the wheels and/or half shafts versus time. The vertical axis represents the vectoring torque that is delivered via the axle to the wheels and the vectoring torque that is delivered via the axle to the wheels increases in the direction of the vertical axis arrow. The horizontal axis represents time and time increases from the left side of the plot to the right side of the plot.

At time t10, the traction torque request is 0 Newton-meters and the torque that is delivered via the axles to the wheels is 0 Newton-meters. Vectoring torque is not requested so the vectoring torque request is zero. The vectoring torque is not delivered to the axle.

At time t11, the vectoring torque request is increased to 1000 Newton-meters and the vectoring torque that is delivered by the axle begins to increase. The vectoring torque reaches 1000 Newton-meters and the vectoring torque that is delivered by the axle reaches 1000 Newton-meters at time t12. The total torque that is delivered via the axis changes very little and is substantially constant (e.g., changes by less than 5%) as the vectoring torque is changed from time t11 to time t12.

At time t13, the vectoring torque request is decreased and the vectoring torque that is delivered by the axle begins to decrease. The vectoring torque reaches 0 Newton-meters and the vectoring torque that is delivered by the axle reaches 0 Newton-meters at time t14. The vectoring torque request continues to decrease and it reaches −1000 Newton-meters at time t15. The vectoring torque that is delivered by the axle reaches −1000 Newton-meters at time t15. The total torque that is delivered via the axis changes very little and is substantially constant (e.g., changes by less than 5%) as the vectoring torque is changed from time t13 to time t15.

At time t16, the vectoring torque request is increased to 0 Newton-meters and the vectoring torque that is delivered by the axle begins to decrease. The total torque that is delivered via the axis changes very little and is substantially constant (e.g., changes by less than 5%) as the vectoring torque is changed. The total torque that is delivered via the axis changes very little and is substantially constant (e.g., changes by less than 5%) as the vectoring torque is changed from time t16 to time t17.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
   requesting an increase in vectoring torque;
   increasing a traction torque in response to the requested increase in vectoring torque while an accelerator pedal is not applied; and
   increasing a torque applied via a wheel brake in response to the increase in vectoring torque.

2. The method of claim 1, further comprising increasing a torque capacity of a second clutch in response to the increase in vectoring torque.

3. The method of claim 1, further comprising operating a first clutch with zero torque capacity in response to the increase in vectoring torque.

4. The method of claim 1, where the vectoring torque is a torque that generates yaw via an axle of a vehicle.

5. The method of claim 1, where the traction torque is increased via increasing output of an electric machine or an internal combustion engine.

6. The method of claim 1, where the wheel brake is a left wheel brake.

7. The method of claim 1, further comprising maintaining a constant total axle torque based on accelerator pedal position.

8. A vehicle operating method, comprising:
   commanding a driveline wheel torque that is a sum of a requested traction torque and a first portion of a requested vectoring torque;
   commanding a first brake to generate a first brake torque, the first brake torque based on the first portion of the requested vectoring torque;
   commanding a second brake to generate a second brake torque, the second brake torque based on the first portion of the requested vectoring torque;
   commanding a first clutch to a first clutch torque capacity, the first clutch torque capacity based on a requested torque of a first wheel and the first portion of the requested vectoring torque; and
   commanding a second clutch to a second clutch torque capacity, the second clutch torque capacity based on the first clutch torque capacity and the requested traction torque.

9. The method of claim 8, where the first brake is a left brake, and where the second brake is a right brake.

10. The method of claim 8, where first clutch is a left clutch, and where the second clutch is a right clutch.

11. The method of claim 8, where the first wheel is a right wheel, and further comprising:
    commanding a pressure of fluid supplied to first brake that is a function of a requested left wheel brake torque, a left_wheel_speed, a left wheel temperature; and
    commanding a pressure of fluid supplied to second brake that is a function of a requested right wheel brake torque, a right wheel speed, and a right wheel temperature.

12. The method of claim 8, where commanding a driveline wheel torque includes commanding an engine to generate the driveline wheel torque.

13. The method of claim 8, where commanding a driveline wheel torque includes commanding an electric machine to generate the driveline wheel torque.

14. The method of claim 8, where first portion of the requested vectoring torque is one half of the requested vectoring torque.

15. The method of claim 8, where the vectoring torque is a torque for generating a yaw moment for a vehicle.

16. A vehicle system, comprising:
    an accelerator pedal;
    a propulsion source;
    an axle system coupled to the propulsion source including a first wheel brake, a second wheel brake, a first clutch, and a second clutch; and
    a controller including executable instructions stored in non-transitory memory to adjust torque output of the propulsion source in response to a position of the accelerator pedal and a vectoring torque, and further executable instructions stored in non-transitory memory to increase a torque capacity of the second clutch and apply a braking torque via the first wheel brake in response to the vectoring torque.

17. The vehicle system of claim 16, where the vectoring torque is a torque that generates yaw of a vehicle.

18. The vehicle system of claim 16, where the propulsion source is an electric machine.

19. The vehicle system of claim 16, where the propulsion source is an internal combustion engine.

20. The vehicle system of claim 16, further comprising additional executable instructions stored in non-transitory memory to increase torque output of the propulsion source in an amount equal to one half of the vectoring torque.

* * * * *